March 12, 1957 S. O. STAGEBERG 2,784,740
CURTAIN TYPE VALVES
Filed Oct. 12, 1951 2 Sheets-Sheet 1
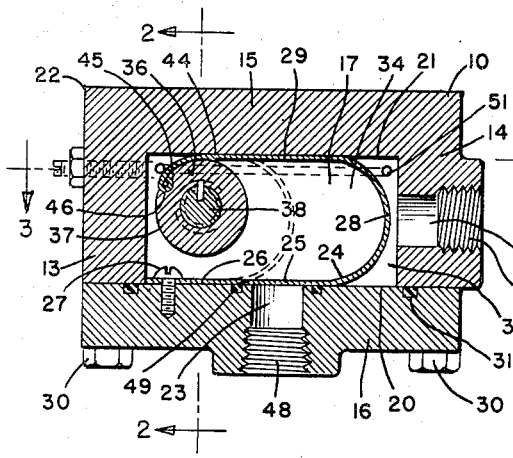
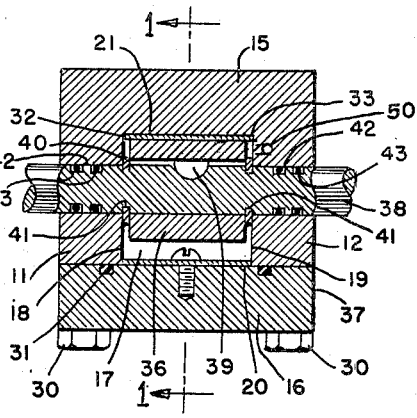
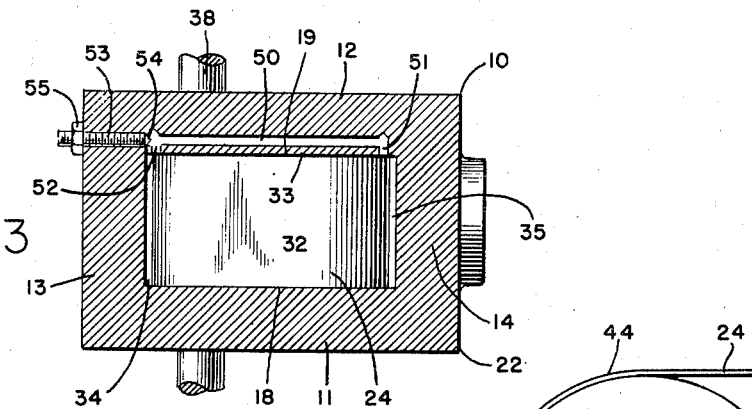
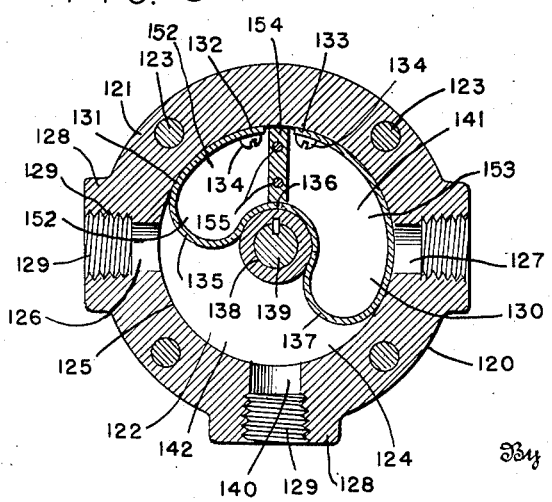
Inventor
STERLING O. STAGEBERG
By Caswell & Lagaard
ATTORNEYS March 12, 1957 S. O. STAGEBERG 2,784,740
CURTAIN TYPE VALVES
Filed Oct. 12, 1951 2 Sheets-Sheet 2
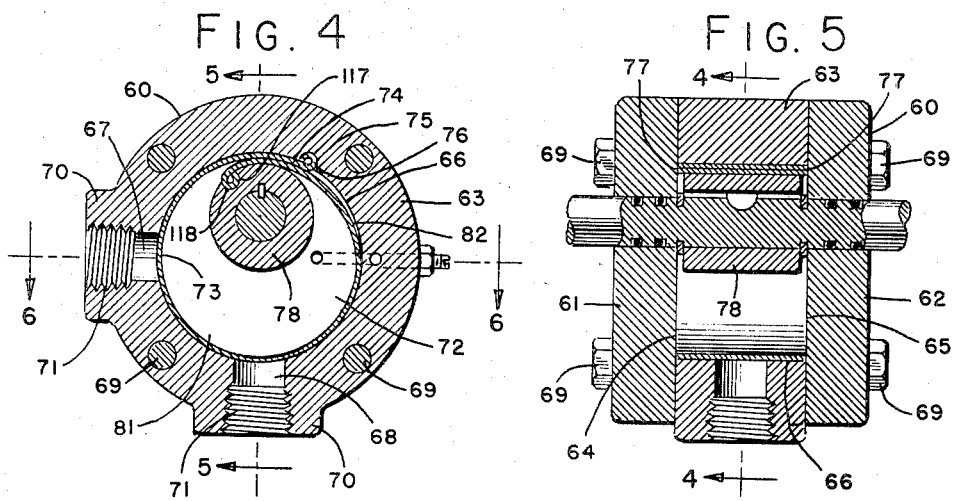
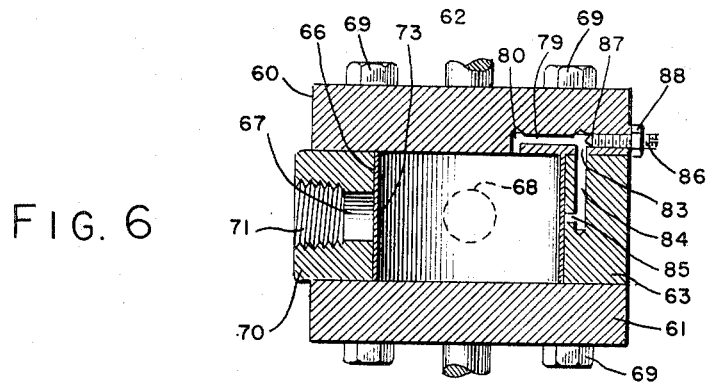
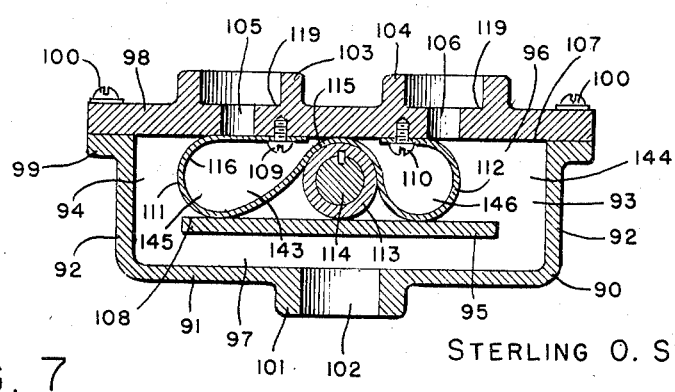
Inventor
STERLING O. STAGEBERG
By Caswell & Lagaard
ATTORNEYS

United States Patent Office 2,784,740
Patented Mar. 12, 1957

2,784,740

CURTAIN TYPE VALVES

Sterling O. Stageberg, Minneapolis, Minn.

Application October 12, 1951, Serial No. 250,968

14 Claims. (Cl. 137—625.44)

The herein disclosed invention relates to valves and has for an object to provide a valve adapted to control relatively great volume of flow and at considerable pressure with a negligible amount of force to open and close the valve.

Another object of the invention resides in providing a valve in which the possibility of leakage is greatly reduced.

An object of the invention resides in providing a valve in which wear of the parts is negligible.

A still further object of the invention resides in providing a valve of the curtain type utilizing a body having a chamber therein bounded by two walls having inner facing parallel planiform surfaces and a wall structure therebetween having first and second spaced surfaces at right angles to the surfaces of said walls, and in providing ports in said wall structure, one of said ports extending through said first surface of said wall structure.

An object of the invention resides in providing a flexible elongated valve member within said chamber having parallel edges engaging the parallel surfaces of said walls and having a portion overlying said first surface and adapted to cover and uncover said port, said valve member being attached to said wall structure at said first surface and having another portion engaging said second surface of said wall structure, said valve member dividing the chamber into inner and outer compartments, said ports being in communication with said outer compartment.

Another object of the invention resides in providing a passageway between the compartments with an adjustable constriction in the passageway to control the flow of fluid from one compartment to the other to control the rate of opening and closing of the valve and to prevent chatter of the valve member upon partial opening of the valve.

An object of the invention resides in providing a valve having two ports and in which one port is closed while the other is opened and vice versa.

Other objects of the invention reside in the novel combination and arrangement of parts and in the details of construction hereinafter illustrated and/or described.

In the drawings:

Fig. 1 is an elevational sectional view of a valve illustrating an embodiment of the invention and taken on line 1—1 of Fig. 2.

Fig. 2 is a cross sectional view taken on line 2—2 of Fig. 1.

Fig. 3 is a plan sectional view of the structure shown in Fig. 1 and taken on line 3—3 of Fig. 1.

Fig. 4 is a view similar to Fig. 1 of a modification of the invention and taken on line 4—4 of Fig. 5.

Fig. 5 is an elevational sectional view taken on line 5—5 of Fig. 4.

Fig. 6 is a plan sectional view taken on line 6—6 of Fig. 4.

Fig. 7 is a view similar to Fig. 1 of another form of the invention.

Fig. 8 is a view similar to Fig. 4 of still another form of the invention.

Fig. 9 is a detail view showing the manner of attaching the flexible valve member to the valve moving member and drawn to an enlarged scale.

The construction shown in the drawings consists of a body having a chamber within the same bounded by means of two walls having facing inner parallel planiform surfaces and a wall structure therebetween having first and second spaced surfaces disposed at right angles to the parallel surfaces of said walls. In this wall structure is formed a port extending through the first of said surfaces. A flexible elongated curtain type valve member is disposed within said chamber which has parallel edges engaging the parallel surfaces of said walls. One end of this valve member is secured to the wall structure at the first surface thereof by means of screws and is adapted to cover or uncover said port. This valve member makes a loop and the portion of the same near the other end thereof engages the second surface of the wall structure and divides said chamber into an inner and an outer compartment. In said wall structure is another port and both of said ports communicate with the outer compartment. Within said chamber is a rotatable valve moving member mounted on a shaft which is journalled in the body and which extends outwardly therefrom and to which a suitable valve operating member may be attached. The end of the flexible valve member engaging the second surface of said wall structure is attached to or engaged by said rotary member so that upon rotation of said shaft the valve member is moved in the direction of its length and caused to cover or uncover said port and close or open the valve. A passageway is provided between the inner and outer compartment and the flow through the same is controlled by an adjustable constrictor in the form of a screw adapted to enter the passageway and partly close the same. In one form of the invention the first and second surfaces of the wall structure are illustrated as parallel while in another form of the invention the surfaces are circular. In still another modification of the invention two ports are adapted to be covered by the flexible valve member and the device is so constructed that one of the ports is opened while the other is closed.

The form of the invention illustrated in Fig. 1 comprises a valve body indicated in its entirety by the reference numeral 10. This body consists of side walls 11 and 12, end walls 13 and 14, a top wall 15 all integral. A closure 16 overlies the ends of the walls 11, 12, 13 and 14. The closure 16 is secured to the walls 11, 12, 13 and 14 by means of cap screws 30 which extend through said closure and are threaded into said walls. A gasket 31 forms a seal between said closure and the walls of the body against which it abuts. These various walls are arranged to provide a chamber 17 within the body. The side walls 11 and 12 have inner facing surfaces 18 and 19 which are planiform and parallel. The cap 16 has an inner surface 20 while the top 15 has a similar surface 21. These surfaces are at right angles to the surfaces 18 and 19 and in the form of the invention shown in Fig. 1 are planiform and parallel. The top 15, closure 16 and the end walls 13 and 14 form a construction between the two walls 11 and 12 which may have any particular form and which has been referred to as a wall structure which is indicated in its entirety by the reference numeral 22.

In the cap 16 is formed a port 23 which extends through the surface 20. An elongated flexible curtain type valve member 24 is disposed within the chamber 17 and has a portion 25 which overlies a part of the surface 20 and which is adapted to cover or uncover the port 23. The extreme end 26 of said valve member adjacent the portion 25 is secured to the closure 16 by means of screws 27. The valve member 24 has a loop 28 constructed in the intermediate portion of the same and which brings another portion 29 of said valve member in overlying position with respect to the surface 21 of top 15. The flexible valve member 24 is of such width that the edges 32 and 33 of the same, which are parallel to one another, engage the surfaces 18 and 19 of the side walls 11 and 12 and form a seal therebetween. By means of this construction the chamber 17 is divided into an inner compartment 34 and an outer compartment 35.

Within the chamber 17 and in the compartment 34 is disposed a rotatable valve moving member 36. This valve moving member is cylindrical in form and has a cylindrical surface 37, the axis of which is disposed at right angles to the surfaces 18 and 19. Through this valve moving member extends a shaft 38 which is keyed thereto by means of a key 39. Split rings 40 received in grooves 41 in the shaft 38 engage the end of the valve moving member 36 and hold the parts assembled within chamber 17 and restrain endwise movement of the shaft 38 of the said member 36. The shaft 38 is journalled in bearings 42 formed in the side walls 11 and 12. O-rings 43 acting between said shaft and bearings form a fluid-tight connection between the body and shaft. Upon the outer end of the shaft 38 may be mounted any suitable operating device for rotating said shaft such as a handle, gear or other suitable construction. Such construction forming no feature of the invention, has not been shown in the drawings. The end 44 of the valve member 24 is formed with a loop 45 which is received in a dovetailed slot 46 formed in the said member 36 and extending through the surface 37 thereof. By means of this construction the portion 29 of the valve member 24 may be moved in the direction of its length by rotating shaft 38 and the loop 28 caused to travel from one end of the body to the other. As said loop moves toward the left as shown in Fig. 1 the portion 25 of said valve member gradually uncovers the port 23.

Formed in the end wall 14 is a port 47 similar to the port 23. Both of these ports are adapted to communicate with the chamber 35. Threads 48 in the closure 16 and wall 14 at the localities of the ports 23 and 47 permit suitable fittings to be secured to the body whereby conduits may be connected to the valve. Encircling the port 23 is a gasket 49 which is adapted to engage the portion 25 of valve member 24 and to effect a leak-proof seal between the body of the valve and said valve member.

A passageway 50, best shown in Fig. 3, is formed in the wall 12 of body 10. This passageway has a portion 51 communicating with compartment 35 and another portion 52 communicating with compartment 34. A screw 53 is screwed into threads formed in the wall 12 and has a pointed end 54 adapted to enter said passageway which forms a constriction to restrict the flow through the passageway. This screw is held in adjusted position by means of a lock nut 55. By means of this construction the flow of fluid through the passageway 50 from one compartment to the other may be manually controlled.

The operation of the valve is as follows: The port 47 forms an inlet port and port 23 the outlet port. Compartment 35 is normally under pressure being directly in communication with port 47. By means of the passageway 50 compartment 34 is also under pressure and at substantially the same pressure as compartment 35. Valve member 24, hence, is urged in neither direction and the pressure on the portion 25 of said valve member being greater than that in the port 23, which is the outlet port, the said portion of the valve member is maintained seated against the gasket 49. This effects a seal against the said gasket and fluid is prevented from leaking by the valve member and into port 23. Upon rotation of shaft 38 in a counter-clockwise direction as viewed in Fig. 1 the end 44 of said valve member is caused to become wrapped about the surface 37 of the valve moving member 36. This shifts the loop 28 toward the left as viewed in Fig. 1 and the portion 25 is gradually raised from the port 23. This opens the valve and allows the fluid to travel in compartment 35 from port 47 to port 23. As the loop 28 is moving the compartment 34 is being reduced in volume and the compartment 35 increased in volume. The flow of fluid of one compartment to another takes place through the passageway 50 since the valve member engages the surfaces 18 and 19 and the surfaces 20 and 21. The control of the flow of fluid from one compartment to the other prevents chattering of the valve member 24 as the valve commences to open and also controls the rate of opening or closing of the valve. After the member 36 has been rotated sufficiently the valve member 24 is completely raised from the port 23 and the valve is open. The parts then become arranged as shown in dotted lines in Fig. 1. Since the pressure on both sides of the valve member 24 is at all times substantially equal, there is no force tending to urge said valve member in either direction. The said valve member may, hence, be rolled off from the valve seat 49 without appreciable effort. Since the compartment 35 is completely open when the valve member 24 has been moved off the seat 49, there is nothing to restrict flow from the inlet port 47 to the outlet port 23 and the passageway therebetween is completely free and large quantities of fluid may flow unobstructed from one port to the other.

In Figs. 4, 5 and 6 another form of the invention has been shown in which a body 60 is employed. This body consists of two end walls 61 and 62 and between which a wall structure 63 is disposed. The end walls 61 and 62 have spaced parallel planiform surfaces 64 and 65 while the wall structure 63 is formed with a cylindrical surface 66. The axis of this surface is at right angles to the surfaces 64 and 65. The wall structure 63 has two ports 67 and 68 formed in the same and which are located approximately 90° from one another. These ports intersect the surface 66. The end walls 61 and 62 are attached to the wall structure 63 by means of cap screws 69 which extend through said end walls and are screwed into the wall structure 63. The said wall structure has bosses 70 disposed adjacent the ports 67 and 68 and which are threaded as indicated at 71 to receive fittings adapted to communicate with the ports 67 and 68. By means of the walls 61 and 62 and structure 63 a chamber 72 is formed in the body 60 which is bounded by the surface 66 of the wall structure 63 and the surfaces 64 and 65 of the ends walls 61 and 62.

Within the chamber 72 is disposed a flexible elongated valve member 73 similar to the valve member 24. One end 74 of said valve member has a loop 75 formed on it and which is adapted to be received in a dovetailed slot 76 in the wall structure 63. The edges 77 of said valve member are parallel and engage the surfaces 64 and 65 of the walls 61 and 62. The valve member 73 follows along the surface 66 and the other end thereof is attached to a rotary valve moving member 78 identical with the valve moving member 36. For the purpose a loop 117, similar to loop 45, is formed on the end of valve member 73 which is received in a slot 118 in the valve moving member 78. The construction for supporting and rotating the said valve moving member being identical with that shown in Fig. 1, will not be again described, but reference is to be had to the description of the valve moving member 36. The valve member 73 divides chamber 72 into inner and outer compartments 81 and 82.

Formed in the end wall 62 of body 60 is a passageway 79 which has a branch 80 communicating with compartment 81. This passageway has another branch 83 which communicates with a passageway 84 in the wall structure 63. This latter passageway again has a branch 85 which communicates with the compartment 82. A screw 86 screwed into the end wall 62 has a pointed end 87 which serves as a constriction for controlling the flow of fluid through the passageways 79 and 84. By means of this construction the flow from one chamber to the other may be regulated as desired. A lock nut 88 on said screw holds the same in adjusted position.

The operation of this form of the invention is the same as that shown in Fig. 1. Normally both ports 68 and 67 are closed. When the member 78 is rotated in a counterclockwise direction the valve member 73 is wound on the same and the portion normally closing port 68 is lifted off said port. This brings the port in full communication with compartment 82. Fluid then flows from compartment 82 through passageways 79 and 84 and into compartment 81. As the valve member is wrapped about the surfaces of the valve moving member 78 the port 67 is next uncovered. This opens the valve in the same manner as the valve shown in Fig. 1. As the compartment 81 becomes smaller in volume the fluid passes through the passageway 79 and 84 and into compartment 82. The control of the rate of flow of fluid through passageways 79 and 84 prevents chattering of the valve member as the same leaves the ports 68 and 67. With the form of the invention here shown port 68 is preferably used as an inlet port and the port 67 as an outlet port. However, if desired, the port 67 may be used as an inlet port and the port 68 as an outlet port.

In Fig. 7 a modification of the invention has been shown in which two outlet ports are illustrated and in which the valve member may close one or the other of said ports. This construction consists of a body 90 having a bottom wall 91, end walls 92, and side walls 93. The side walls are formed with surfaces 94 which are planiform and parallel to one another as in the other forms of the invention. Within the interior of the body 10 is provided a partition 95 which is parallel to the bottom 91 and falls short of the end walls 92 and which forms with said body a chamber 96 and a passageway 97 communicating therewith at its ends. The body 90 is closed by means of a cover 98 which is secured to a flange 99 formed on the body by means of screws 100.

On the bottom wall 91 is formed a boss 101 in which a suitable fitting may be sweated and which serves as an inlet to the valve. This boss has a passageway 102 communicating with the passageway 97. In the cover 98 are formed two spaced bosses 103 and 104 which are formed with sockets 119 to receive fittings which may be sweated to said bosses. These bosses are formed with ports 105 and 106 which extend through the inner surface 107 of the said cover. This surface is planiform and is parallel with a similar planiform surface 108 formed on the partition 95. Both of these surfaces are perpendicular to the surfaces 94.

An elongated resilient valve member 116 is secured at its ends by means of screws 109 and 110 to the cover 98 at localities between the ports 105 and 106. Portions of this valve member engage the surfaces 94 of the side walls 93, similar to the valve members of the other forms of the invention, and has end loops 111 and 112 which engage the surface 108 and an intermediate loop 115 which engages the surface 107. These loops are adapted to cover or uncover the ports 105 and 106 as previously described to open and close the valves formed thereby. The valve member 116 divides the chamber 96 into an inner compartment 143 and an outer compartment 144. In addition the loop 115 divides the compartment 143 into other compartments 145 and 146.

In the center of the space between the surfaces 107 and 108 is mounted a rotary valve moving member 113 which has its axis at right angles to the surfaces 194. This member is cylindrical in form and is mounted for rotation on a shaft 114 extending through the walls 93 of the body and journalled similarly to the shaft 38 previously described. The valve moving member 113 is received within the loop 115. This valve moving member upon rotation of the shaft 114 frictionally engages the valve member 116 at loop 115 and shifts the loops 111 and 112 from side to side. As the said loops are moved the ports 105 and 106 are alternately uncovered and covered and the respective valves formed thereby opened and closed. As illustrated, one of the valves is always open when the other is closed and vice versa. However, by making the valve member 116 slightly longer, both valves may be maintained closed at the outset and then either of the valves opened while the other valve remains closed.

To control the flow of fluid between compartments 143 and 144 and between compartments 145 and 146 the width of the valve member 116 is made slightly less than the distance between the surfaces 94 to provide one or more leakage passageways between said valve member and body 90, conducting fluid from one compartment to the other and from one end of compartment 143 to the other at a predetermined rate. This leakage can be accurately controlled by the proper tolerance so as to give the same results as the passageway 50 and screw 53 of the form of the invention shown in Figs. 1, 2 and 3, the only difference being that the constriction formed is not adjustable.

In Fig. 8 another form of the invention is shown which combines features of both of the valves shown in Figs. 4 and 7. This valve comprises a body 120 constructed with an annular wall structure 121. Overlying this wall structure are two end walls 122 which are secured to the wall structure 121 by means of cap screws 123. The end walls 122 have spaced parallel planiform surfaces 124 and the wall structure 121 is formed with a cylindrical surface 125. The axis of the surface 125 is at right angles to the surfaces 124. The wall structure 121 has two outlet ports 126 and 127 formed in the same and which are located diametrically opposite one another. In addition the said wall structure has an inlet port 140 situated midway between the ports 126 and 127. All of these ports intersect the surface 125. The wall structure 121 has bosses 128 formed thereon and which are threaded as indicated at 129 to receive fittings which communicate with the ports 126, 127 and 140. By means of the walls 122 and the wall structure 121 a chamber 130 is formed in the body 120 which is bounded by the surfaces 124 of end walls 122 and the surface 125 of wall structure 121.

Within the chamber 130 is disposed an elongated flexible valve member 131 similar to the valve member 116. This valve member has ends 132 and 133 which are disposed in close proximity to each other and which overlie the surface 125 of the wall structure 121 and are secured to said wall structure by means of screws 134. This valve member is formed with three loops 135, 136 and 137 similar to the valve member 116.

In the center of the valve body 120 and concentric with the surface 125 of wall structure 121 is mounted a rotary valve moving member 138 which has its axis at right angles to the surface 124 of end walls 122. This member is cylindrical in form and is mounted for rotation on a shaft 139 extending through the walls 122 of the body and journalled similarly to the shaft 38 previously described. This valve moving member is received within the loop 136 of the valve member 131 and frictionally engages the same to cause the loops 135 and 137 to roll over or away from the ports 126 and 127. If desired, the flexible valve member 131 may be attached to the valve moving member 138 and in such case positively driven. However, when friction alone is relied on less opportunity for breakage of the valve member occurs and greater distance of travel can be secured.

By means of the valve member 131 the chamber 130 is divided into an inner compartment 141 and an outer compartment 142. All of the ports 126, 127 and 140 communicate with the compartment 142. Extending between the surfaces 124 and between the surface 125 and valve member 131 is a partition 154. This partition is secured to the end walls 122 by means of screws 155. The loop 136 of valve member 131 is slidable past said partition. This partition divides the compartment 141 into right and lefthand compartments 152 and 153. To control the flow of fluid from one compartment 152 to the other compartment 153 and vice versa to equalize the pressure on both sides of the valve partition 140, the width of the said valve member is slightly less than the distance between the parallel surfaces 124 so that a definite amount of leakage occurs therebetween. This leakage can be positively controlled by the clearance thus afforded and operates in the same manner as the control afforded by the passageway 150 in the form of the invention shown in Fig. 1 and the screw 186 except that the said flow cannot be varied.

In operation the rotation of shaft 139 shifts the position of the loop 136 in the valve member 131 from one side to the other causing the loops 135 and 137 to alternately roll off and on the ports 126 and 127. Thus one valve is closed while the other is opened and vice versa. By making the valve member 131 slightly longer both of the valves can be initially closed if desired.

The advantages of the invention are manifest. A minimum amount of force is required to operate the valve regardless of pressure and volume of flow. The pressure being the same on both sides of the valve member, the valve member is easily moved and undergoes no particular strain. By controlling the flow of fluid from one chamber to the other in the forms of the invention in which the volume of the chambers varies, chattering of the valve member upon initial opening of the valve is prevented. The valve can be constructed at a nominal expense and by machinery and equipment readily available for the purpose. With the invention a soft seat may be employed so as to procure a positive seal. The user is unable to force the valve member into intimate contact with the seat and thus injure the seat. The pressure on the seat is determined solely by the pressure of the fluid conducted.

Changes in the specific form of the invention, as herein described, may be made within the scope of what is claimed without departing from the spirit of the invention.

Having described the invention, what is claimed as new and desired to be protected by Letters Patent is:

1. In a valve, a body having a chamber therein bounded by two walls provided with facing parallel planiform inner surfaces and a wall structure therebetween having first and second surfaces, disposed at different portions of the wall structure and at right angles to said parallel surfaces, an outlet port in said wall structure extending through said first surface of the wall structure, an elongated flexible curtain type valve member disposed within said chamber and formed with parallel edges engaging the parallel surfaces, said valve member having a portion overlying said first surface of said wall structure and adapted to cover said port, means engaging said valve member at said portion thereof and said body to secure said valve member thereto, said valve member having a second portion overlying said second surface of said wall structure and dividing said chamber into an inner and an outer compartment, one on each side of said valve member, a movable member connected to the second named portion of said valve member and serving upon movement to move such portion of the valve member in the direction of its length to shift the first named portion of said valve member over or away from said port, means urging said second portion of the valve member into engagement with the second surface of said wall structure, an inlet port in said body disposed intermediate the first and second surfaces of said wall structure, both of said ports being adapted to communicate with said outer compartment and means forming a restricted passageway between said compartments to conduct fluid from one compartment to the other at a predetermined rate as said valve member is moved into valve opening position.

2. In a valve, a body having a chamber therein bounded by two walls provided with facing parallel planiform inner surfaces and a wall structure therebetween having first and second surfaces, disposed at different portions of the wall structure and at right angles to said parallel surfaces, an outlet port in said wall structure extending through said first surface of the wall structure, an elongated flexible curtain type valve member disposed within said chamber and formed with parallel edges engaging the parallel surfaces, said valve member having a portion overlying said first surface of said wall structure and adapted to cover said port, means engaging said valve member at said portion thereof and said body to secure said valve member thereto, said valve member having a second portion overlying said second surface of said wall structure and dividing said chamber into an inner and an outer compartment, one on each side of said valve member, a movable member connected to the second named portion of said valve member and serving upon movement to move such portion of the valve member in the direction of its length to shift the first named portion of said valve member over or away from said port, means urging said second portion of the valve member into engagement with the second surface of said wall structure, an inlet port in said body disposed intermediate the first and second surfaces of said wall structure, both of said ports being adapted to communicate with said outer compartment and means forming a passageway between said compartments to conduct fluid from one compartment to the other at a predetermined rate as said valve member is moved into valve opening position, and an adjustable constricting member in said passageway for controlling the rate of flow from one compartment to the other to prevent chattering of the flexible member upon initial uncovering of said port.

3. In a valve, a body having a chamber therein bounded by two walls provided with facing parallel planiform inner surfaces and a wall structure therebetween having first and second surfaces, disposed at different portions of the wall structure and at right angles to said parallel surfaces, an outlet port in said wall structure extending through said first surface of the wall structure, an elongated flexible curtain type valve member disposed within said chamber and formed with parallel edges engaging the parallel surfaces, said valve member having a portion overlying said first surface of said wall structure and adapted to cover said port, means engaging said valve member at said portion thereof and said body to secure said valve member thereto, said valve member having a second portion overlying said second surface of said wall structure and dividing said chamber into an inner and outer compartment, one on each side of said valve member, a movable member connected to the second named portion of said valve member and serving upon movement to move such portion of the valve member in the direction of its length to shift the first named portion of said valve member over or away from said port means urging said second portion of the valve member into engagement with the second surface of said wall structure, an inlet port in said body disposed intermediate the first and second surfaces of said wall structure, both of said ports being adapted to communicate with said outer compartment and means forming a passageway between said compartments to conduct fluid from one compartment to the other at a predetermined rate as said valve member is moved into valve opening position, and a screw screwed into said body and having a portion entering said passageway and controlling the rate of flow of fluid from one compartment to the other as the valve member is moved to valve opening position.

4. In a valve, a body having a chamber therein bounded by two walls provided with facing parallel planiform inner surfaces and a wall structure therebetween having first and second parallel surfaces disposed at opposite sides of said wall structure and at right angles to said parallel planiform surfaces, an outlet port in said wall structure extending through said first surface of the wall structure, an elongated flexible curtain type valve member disposed within said chamber and formed with parallel edges engaging the parallel planiform surfaces, said valve member having a portion overlying said first surface of said wall structure and adapted to cover said port, means engaging said valve member at said portion thereof and said body to secure said valve member thereto, said valve member having a second portion overlying said second surface of said wall structure and dividing said chamber into an inner and an outer compartment, one on each side of said valve member, a movable member connected to the second named portion of said valve member and serving upon movement to move such portion of the valve member in the direction of its length and along said second surface to shift the first named portion of said valve member over or away from said port means urging said second portion of the valve member into engagement with the second surface of said wall structure, an inlet port in said body and disposed intermediate said first and second surfaces of said wall structure, both of said ports being adapted to communicate with said outer compartment and means forming a restricted passageway between said compartments to conduct fluid from one compartment to the other at a predetermined rate as said valve member is moved into valve opening position.

5. In a valve, a body having a chamber therein bounded by two walls provided with facing parallel planiform inner surfaces and a wall structure therebetween having first and second parallel surfaces disposed at opposite sides of said wall structure and at right angles to said parallel planiform surfaces, an outlet port in said wall structure extending through said first surface of the wall structure, an elongated flexible curtain type valve member disposed within said chamber and formed with parallel edges engaging the parallel planiform surfaces, said valve member having a portion overlying said first surface of said wall structure and adapted to cover said port, means engaging said valve member at said portion thereof and said body to secure said valve member thereto, said valve member having a second portion overlying said second surface of said wall structure and dividing said chamber into an inner and an outer compartment, one on each side of said valve member, a rotary valve moving member extending transversely of said compartment and journaled in said body, said valve moving member having a cylindrical surface at right angles to the parallel planiform surfaces of said walls, attaching means for securing the end of said valve member issuing from the portion thereof overlying the second surface of said wall structure to said rotary valve moving member, said valve moving member holding the portion of said flexible valve member overlying the second surface of said wall structure in contact therewith, said valve moving member upon rotation procuring movement of said valve member in the direction of its length and along said second surface of said wall structure to shift the first named portion of said valve member over or away from said port means urging said second portion of the valve member into engagement with the second surface of said wall structure, an inlet port in said body disposed intermediate the first and second surfaces of said wall structure, both of said ports being adapted to communicate with said outer compartment and means forming a restricted passageway between said compartments to conduct fluid from one compartment to the other at a predetermined rate as said valve member is moved into valve opening postion.

6. In a valve, a body having a chamber therein bounded by two walls provided with facing parallel planiform inner surfaces and a wall structure therebetween having a circular bore whose axis lies at right angles to the parallel surfaces of said walls, a port formed in said wall structure and intersecting said bore, a second port formed in said wall structure and intersecting said bore and being disposed on one side of said first port, an elongated flexible valve member disposed within said chamber and having parallel edges engaging the parallel surfaces of said walls, said flexible member following along said bore and being adapted to cover both of said ports, attaching means engaging said flexible valve member at one end and said wall structure for securing said valve member to said wall structure and disposed on the other side of said first named port, a rotary valve moving member having a cylindrical surface whose axis is at right angles to the surfaces of said walls and eccentric with reference to the axis of said bore, said rotary valve moving member being disposed on the same side of said first named port as said attaching means, and other attaching means between the other end of said flexible valve member and said rotary valve moving member whereby the valve member may be wrapped about said rotary valve member and moved along said bore to successively uncover or cover said ports, said valve member dividing said chamber into an inner and an outer compartment and closing communication between said compartments at the end of said valve member attached thereto, said ports being adapted to communicate with said outer compartment and means forming a restricted passageway between said compartments to conduct fluid from one compartment to the other at a predetermined rate as said valve member is moved into valve opening position.

7. In a valve, a body having a chamber therein bounded by two walls provided with facing parallel planiform inner surfaces and a wall structure therebetween having a circular bore whose axis lies at right angles to the parallel surfaces of said walls, a port formed in said wall structure and intersecting said bore, a second port formed in said wall structure and intersecting said bore and being disposed on one side of said first port, an elongated flexible valve member disposed within said chamber and having parallel edges engaging the parallel surfaces of said walls, said flexible member following along said bore and being adapted to cover both of said ports, attaching means engaging said flexible valve member at one end and said wall structure for securing said valve member to said wall structure and disposed on the other side of said first named port, a rotary valve moving member having a cylindrical surface whose axis is at right angles to the surfaces of said walls and eccentric with reference to the axis of said bore, said rotary valve moving member being disposed on the same side of said first named port as said attaching means, and other attaching means between the other end of said flexible valve member and said rotary valve moving member whereby the valve member may be wrapped about said rotary valve member and moved along said bore to successively uncover or cover said ports, said valve member dividing said chamber into an inner and an outer compartment, said ports being adapted to communicate with said outer compartment and means forming a restricted passageway between said compartments to conduct fluid from one compartment to the other at a predetermined rate as said valve member is moved into valve opening position, said rotary valve moving member being disposed in juxtaposition with reference to said bore and maintaining the portion of said valve member attached thereto in contact with the portion of said valve member attached to said wall structure to close communication between said compartments at such locality.

8. In a valve, a body having a chamber therein bounded by two walls provided with facing parallel planiform inner surfaces and a wall structure therebetween having first and second surfaces, disposed at different portions of the wall structure and at right angles to said parallel planiform surfaces, an outlet port in said wall structure extending through said first surface of the wall structure, an elongated flexible curtain type valve member disposed within said chamber and formed with parallel edges engaging the parallel surfaces, said valve member having a portion overlying said first surface of said wall structure and adapted to cover said port, means engaging said portion of the valve member at an end thereof and said body to secure said valve member to said body, said valve member having a second portion overlying said second surface of said wall structure, a movable member connected to the second portion at the other end of said valve member and serving upon movement to move the valve member in the direction of its length to shift the first named portion of the valve member over or away from said port, said valve member dividing said chamber into inner and outer compartments one on each side of said valve member, said movable member being positioned in a manner to close communication between said compartments at the end of said valve member attached to said movable member, an inlet port in said body disposed intermediate the first and second surfaces of said wall structure, both of said ports being adapted to communicate with said outer compartment and means forming a restricted passageway between said compartments to conduct fluid from one compartment to the other at a predetermined rate as said valve member is moved into valve opening position.

9. In a valve, a body having a chamber therein bounded by two walls provided with facing parallel planiform inner surfaces and a wall structure therebetween having first and second parallel side surfaces disposed at opposite sides of said wall structure and at right angles to said parallel planiform surfaces and an end surface between said side surfaces, an outlet port in said wall structure extending through said first surface of the wall structure, an elongated flexible curtain type valve member disposed within said chamber and formed with parallel edges engaging the parallel planiform surfaces, said valve member having a portion overlying said first surface of said wall structure and adapted to cover said port, means engaging said valve member at said portion thereof and said body to secure said valve member thereto, said valve member having a second portion overlying said second surface of said wall structure and a loop between said first and second portions thereof and dividing said chamber into an inner and an outer compartment, one on each side of said valve member, a movable member connected to the second named portion of said valve member and serving upon movement to move such portion of the valve member in the direction of its length and along said second surface to shift said loop toward and from said end surface and the first named portion of said valve member over or away from said port, means urging said second portion of the valve member into engagement with the second surface of said wall structure, an inlet port in said wall structure extending through said end surface, both of said ports being adapted to communicate with said outer compartment and means forming a restricted passageway between said compartments to conduct fluid from one compartment to the other at a predetermined rate as said valve member is moved into valve opening position.

10. In a valve, a body having a chamber therein bounded by two walls provided with spaced facing parallel planiform inner surfaces and a wall structure therebetween having first and second spaced facing surfaces disposed at spaced portions of the wall structure and at right angles to said parallel surfaces, an outlet port in said wall structure extending through said first surface of said wall structure, an elongated flexible curtain type valve member disposed within said chamber and having oppositely facing longitudinal edges engaging said parallel surfaces, said valve member having a portion overlying said first surface of said wall structure and adapted to cover said port, means engaging said valve member at said portion thereof and said body to secure said valve member thereto, said valve member having a second portion overlying said second surface of said wall structure, means closing the space between the ends of the first and second portions of said valve member and guiding the second end of said valve member for movement along said second surface of said wall structure, said last named means and said valve member dividing said chamber into an inner and outer compartment, one on each side of said valve member, a movable member connected to the second named portion of said valve member and serving upon movement to move such portion of the valve member in the direction of its length to shift the first named portion of said valve member over or away from said port, an inlet port in said body disposed intermediate the first and second surfaces of said wall structure, both of said ports being adapted to communicate with said outer compartment and means forming a restricted passageway between said compartments to conduct fluid from one compartment to the other at a predetermined rate as said valve member is moved into valve opening position.

11. In a valve, a body having a chamber therein bounded by two walls provided with facing parallel planiform inner surfaces and a wall structure therebetween having first and second surfaces, disposed at different portions of the wall structure and at right angles to said parallel surfaces, two spaced ports formed in said wall structure and extending through said first surface thereof, an elongated flexible curtain type valve member within said chamber and formed with parallel edges engaging the parallel surfaces of said walls, said valve member at its ends overlying said first surface and being adapted to cover said ports, attaching means between the extreme ends of said valve member and body and attaching said valve member thereto, said valve member forming two oppositely facing loops each having portions engaging said second surface of the wall structure and dividing said chamber into inner and outer compartments, said ports being adapted to communicate with said outer compartment, and a movable member engaging said valve member intermediate said loops and serving upon movement to move said valve member in a direction of its length to alternately cover and uncover said ports and means forming a restricted passageway between said compartments to conduct fluid from one compartment to the other at a predetermined rate as said valve member is moved into valve opening position.

12. In a valve, a body having a chamber therein bounded by two walls provided with facing parallel planiform inner surfaces and a wall structure therebetween having first and second surfaces, disposed at different portions of the wall structure and at right angles to said parallel surfaces, two spaced ports formed in said wall structure and extending through said first surface thereof, an elongated flexible curtain type valve member within said chamber and formed with parallel edges engaging the parallel surfaces of said walls, said valve member at its ends overlying said first surface and being adapted to cover said ports, attaching means between the extreme ends of said valve member and wall structure and attaching said valve member thereto, said valve member forming two oppositely facing loops each having portions engaging said second surface of the wall structure and dividing said chamber into inner and outer compartments, said ports being adapted to communicate with said outer compartment, and a rotatable valve moving member disposed between said first and second surfaces and between said ports and having a cylindrical surface whose axis is at right angles to the parallel surfaces of said walls, said valve member having a third loop between said first named loops and engageable with said rotary valve moving member to procure movement of said valve member in the direction of its length to successively cover and uncover said ports and means forming a restricted passageway between said compartment to conduct fluid from one compartment to the other at a predetermined rate as said valve member is moved into valve opening position.

13. In a valve, a body having a chamber therein bounded by two walls provided with facing parallel planiform inner surfaces and a wall structure therebetween having first and second surfaces, disposed at different portions of the wall structure and at right angles to said parallel surfaces, two spaced ports formed in said wall structure and extending through said first surface thereof, an elongated flexible curtain type valve member within said chamber and formed with parallel edges engaging the parallel surfaces of said walls, said valve member at its ends overlying said first surface and being adapted to cover said ports, attaching means between the extreme ends of said valve member and wall structure and attaching said valve member thereto, said valve member forming two oppositely facing loops each having portions engaging said second surface of the wall structure and dividing said chamber into inner and outer compartments, said ports being adapted to communicate with said outer compartment, and a rotatable valve moving member disposed between said first and second surfaces and between said ports and having a cylindrical surface whose axis is at right angles to the parallel surfaces of said walls, said valve member having a third loop between said first named loops and engageable with said rotary valve moving member to procure movement of said valve member in the direction of its length to successively cover and uncover said ports, said valve member being of such length that when one of the ports is covered the other is uncovered and vice versa, and means forming a restricted passageway between said compartments to conduct fluid from one compartment to the other at a predetermined rate as said valve member is moved into valve opening position.

14. In a valve, a body having a chamber therein bounded by two walls provided with spaced facing parallel planiform inner surfaces and a wall structure therebetween having first and second spaced facing surfaces disposed at spaced portions of the wall structure and at right angles to said parallel surfaces, an outlet port in said wall structure extending through said first surface of said wall structure, an elongated flexible curtain type valve member disposed within said chamber and having oppositely facing longitudinal edges engageable with certain portions of said parallel surfaces, said valve member having a portion overlying said first surface of said wall structure and adapted to cover said port, means engaging said valve member at said portion thereof and said body to secure said valve member thereto, said valve member having a second portion overlying said second surface of said wall structure, means closing the space between the ends of the first and second portions of said valve member and guiding the second end of said valve member for movement along said second surface of said wall structure, said last named means and said valve member dividing said chamber into an inner and outer compartment, one on each side of said valve member, a movable member connected to the second named portion of said valve member and serving upon movement to move such portion of the valve member in the direction of its length to shift the first named portion of said valve member over or away from said port, an inlet port in said body disposed intermediate the first and second surfaces of said wall structure, both of said ports being adapted to communicate with said outer compartment, one of the edges of said valve member being spaced at a portion thereof from the adjoining parallel surface of the body to form a restricted passageway connecting one compartment with the other and conducting fluid from one compartment to the other at a predetermined rate as said valve member is moved into valve opening position.

References Cited in the file of this patent

UNITED STATES PATENTS

| | | |
|---|---|---|
| 1,852,582 | Longacre | Apr. 5, 1932 |
| 2,417,246 | Ferguson | Mar. 11, 1947 |

FOREIGN PATENTS

| | | |
|---|---|---|
| 14,177 | Norway | of 1904 |
| 981,519 | France | of 1951 |